United States Patent
Okada

(10) Patent No.: US 7,061,368 B2
(45) Date of Patent: Jun. 13, 2006

(54) REMOTE CONTROL SYSTEM FOR ON-VEHICLE EQUIPMENT AND REMOTE CONTROL METHOD FOR THE SAME

(75) Inventor: Hiroki Okada, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 343 days.

(21) Appl. No.: 10/316,016

(22) Filed: Dec. 11, 2002

(65) Prior Publication Data

US 2003/0117295 A1 Jun. 26, 2003

(30) Foreign Application Priority Data

Dec. 26, 2001 (JP) ............... 2001-394562

(51) Int. Cl.
| | |
|---|---|
| G05B 19/00 | (2006.01) |
| G06F 7/00 | (2006.01) |
| G06K 19/00 | (2006.01) |
| G08B 29/00 | (2006.01) |
| H04B 29/00 | (2006.01) |

(52) U.S. Cl. ............... 340/5.6; 340/5.7; 340/10.41
(58) Field of Classification Search ........... 340/5.6, 340/5.7, 825.69, 826.72, 10.1, 10.5, 426, 340/428; 307/10.2, 10.3, 10.5; 123/179
See application file for complete search history.

(56) References Cited

U.S. PATENT DOCUMENTS

| | | | |
|---|---|---|---|
| 5,736,935 A | * 4/1998 | Lambropoulos | ....... 340/825.69 |
| 5,751,073 A | 5/1998 | Ross | |
| 5,818,330 A | * 10/1998 | Schweiger | ............. 340/426.13 |
| 5,912,512 A | * 6/1999 | Hayashi et al. | ............ 307/10.5 |
| 6,181,026 B1 | * 1/2001 | Treharne et al. | ........... 307/10.3 |
| 6,191,703 B1 | * 2/2001 | Wallace | ................. 340/825.69 |
| 6,323,566 B1 | * 11/2001 | Meier | ....................... 307/10.2 |
| 6,469,616 B1 | * 10/2002 | Lindner et al. | ............ 340/5.26 |
| 6,489,886 B1 | * 12/2002 | Meier | ...................... 340/426.1 |
| 6,496,100 B1 | * 12/2002 | Hiebl | ........................ 340/5.31 |
| 6,570,486 B1 | * 5/2003 | Simon et al. | ................ 340/5.1 |
| 6,801,134 B1 | * 10/2004 | Juzswik | ................. 340/825.69 |

FOREIGN PATENT DOCUMENTS

| | | |
|---|---|---|
| DE | 100 24 852 C1 | 11/2001 |
| EP | 0 502 566 A1 | 9/1992 |
| EP | 0 767 286 A2 | 4/1997 |
| JP | A 2000-103316 | 4/2000 |
| WO | WO 99/02377 | 1/1999 |

* cited by examiner

Primary Examiner—Michael Horabik
Assistant Examiner—Nam Nguyen
(74) Attorney, Agent, or Firm—Oliff & Berridge, PLC

(57) ABSTRACT

In an on-vehicle equipment remote control system provided with a portable unit that a vehicle operator can carry and an on-vehicle unit that executes a predetermined process if a code content of a response signal issued by the portable unit in response to a transmitted request signal matches a required code content, the on-vehicle unit transmits the request signal on a first frequency prior to the start of a vehicle power source and transmits the request signal on a second frequency that is higher than the first frequency after the start of the vehicle power source.

20 Claims, 11 Drawing Sheets

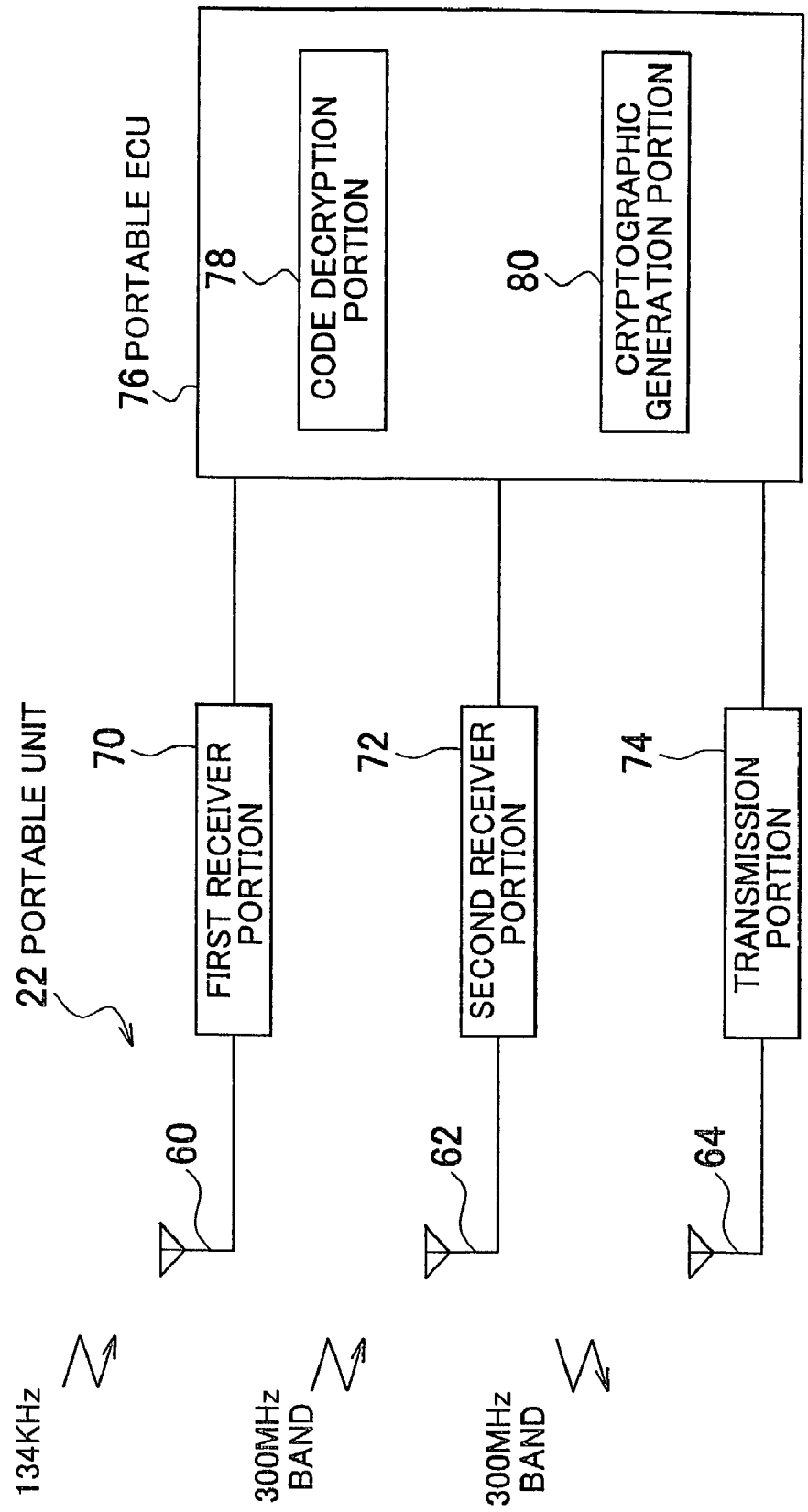

26 FIRST VEHICLE INSIDE
TRANSMISSION ANTENNA

28 SECOND VEHICLE INSIDE
TRANSMISSION ANTENNA

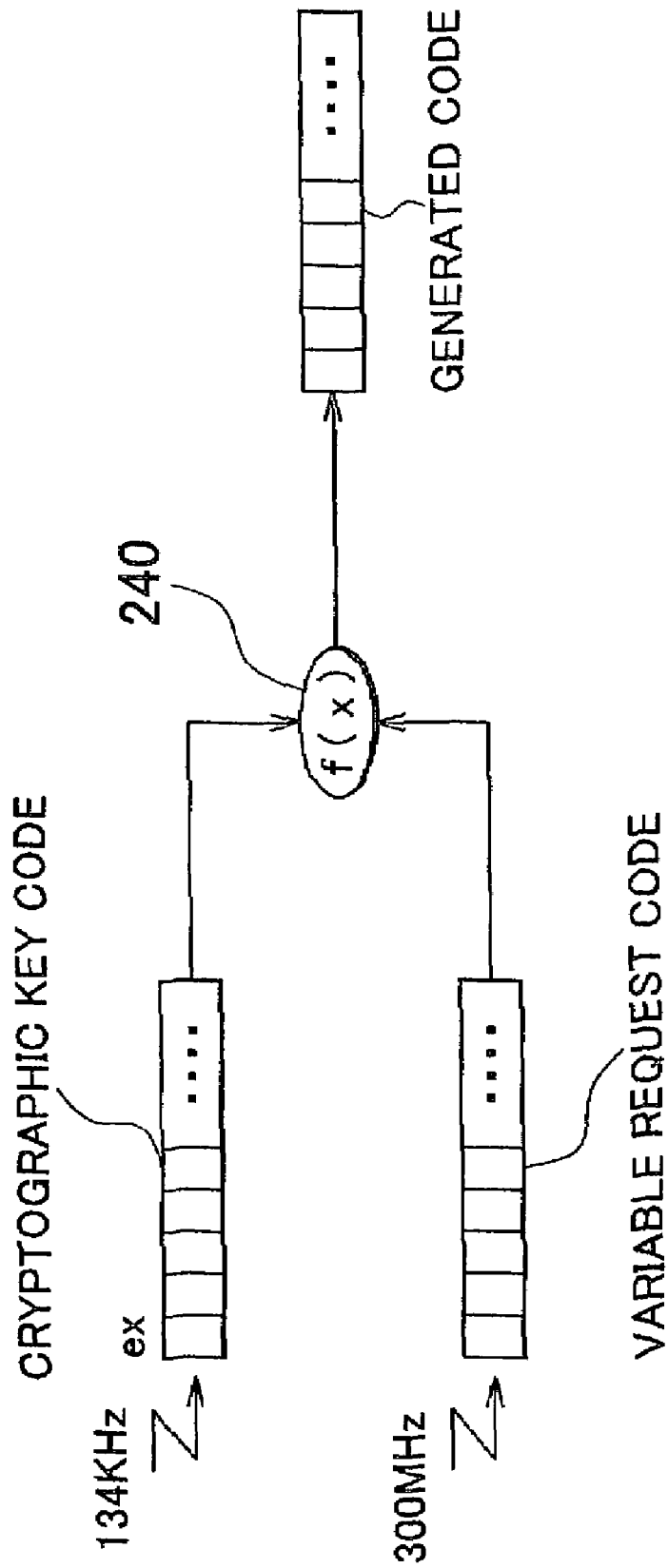

REMOTE CONTROL SYSTEM FOR ON-VEHICLE EQUIPMENT AND REMOTE CONTROL METHOD FOR THE SAME

INCORPORATION BY REFERENCE

The disclosure of Japanese Patent Application No. 2001-394562 filed on Dec. 26, 2001 including the specification, drawings and abstract is incorporated herein by reference in its entirety.

BACKGROUND OF THE INVENTION

1. Field of Invention

The invention relates to a remote control system for on-vehicle equipment and a remote control method. More specifically, this invention relates to a remote control system for on-vehicle equipment that includes a portable unit and an on-vehicle unit that executes a predetermined process when a code content of a response signal issued by the portable unit in response to a transmitted request signal matches a required code content, and a remote control method for the same.

2. Description of Related Art

An on-vehicle equipment remote control system provided with a portable unit and an on-vehicle unit, which controls permission or non-permission of use of a vehicle based on the result of a code collation of a communication between the two units, has been known. An example of this kind of system is disclosed in Japanese Laid-Open Publication No. 2000-103316. This system, when a code content of a response signal issued by the portable unit in response to a code request signal from the on-vehicle unit matches a required code content, permits the locking or unlocking of a vehicle door, or permits the start of an internal combustion engine that powers a vehicle. Therefore, this system enables locking or unlocking of a vehicle door remotely and without contact, using the communication between the on-vehicle unit and the portable unit. This system also enables a vehicle operator to cause the internal combustion engine to start without inserting an ignition key into a key cylinder.

If the internal combustion engine is started in this way without inserting the ignition key into the cylinder, however, there is the possibility that the portable unit may be taken away from the vehicle while the internal combustion engine is operating. If the portable unit is taken away from the vehicle and the vehicle continues operating in that state, a problem is caused whereby locking or unlocking of the door or re-starting the internal combustion engine will become impossible once the internal combustion engine has then stopped operating.

Therefore, this system verifies whether the portable unit is present inside the vehicle using the communication between the on-vehicle unit and the portable unit when the vehicle is in a used state due to the operating of the internal combustion engine. As a result of this verification, if the portable unit is determined not to be present inside the vehicle, an alarm is issued to the vehicle operator. Therefore according to this system, it is possible to prevent the taking away from the vehicle of the portable unit which is necessary for controlling permission or non-permission of vehicle use, and which the vehicle operator needs to carry.

The higher a frequency of a radio wave is, in other words, the shorter the wavelength of the radio wave is, the stronger its directional stability becomes, the weaker its turnaround is, and the easier it is to attenuate it. For this reason, if the communication from the on-vehicle unit to the portable unit (hereinafter referred to as a "downlink communication") utilizes a high frequency radio wave that has weak turnaround and is easy to attenuate, and if, for example, the system is utilized while the portable unit is inside the pocket or the like of a vehicle operator, since the body of a person or the like becomes interpositioned between the on-vehicle unit and the portable unit, a situation may arise where the radio wave from the on-vehicle unit may not reach the portable unit, despite the portable unit being present in the proximity of the on-vehicle unit. Also, it is necessary to transmit the radio wave with a high electromagnetic strength to ensure a required communication area in this case. However, if the high frequency radio wave is utilized for the downlink communication, a stable communication area between the on-vehicle unit and the portable unit cannot be secured, and a situation arises where highly efficient and secure communication between the two units cannot take place.

This conventional system utilizes a comparatively low frequency LF band (specifically 134 kHz) radio wave for the downlink communication from the on-vehicle unit to the portable unit. Therefore, this system ensures the stable communication area because the portable unit receives the request signal from the on-vehicle unit reliably, even if the body becomes interpositioned between the two units.

When the internal combustion engine that powers the vehicle or an inverter of an electric vehicle or the like is operating, however, broad band noise such as ignition noise, motor noise or inverter noise is generated. The lower a frequency of this kind of noise is, the larger its energy. Therefore, the lower the communication frequency between the on-vehicle unit and the portable unit, the easier it becomes for that radio wave to be superimposed by the noise. Therefore, if, as in this conventional system, the communication between the on-vehicle unit and the portable unit utilizes the comparatively low frequency radio wave such as the LF band even after the start of an internal combustion engine or the like, it becomes easier for communication errors to be generated, due to the noise generated by the operation of the internal combustion engine or the like. If communication errors are generated between the on-vehicle unit and the portable unit, verification of the presence of the portable unit inside the vehicle, that is verification that the portable unit has not been taken away from the vehicle, cannot then be carried out with a good degree of accuracy.

SUMMARY OF THE INVENTION

In view of the foregoing problems, it is an object of the invention, regarding a communication between an on-vehicle unit and a portable unit, to provide an on-vehicle equipment remote control system that can ensure a stable communication area prior to the start of a vehicle power source, such as an internal combustion engine or the like, and can suppress the incidence of communication errors caused by the operation of the vehicle power source after the start of the vehicle power source, and a remote control method for the same.

Therefore, the on-vehicle equipment remote control system is provided with a portable unit that can be carried, and an on-vehicle unit that executes a predetermined process when a code content of a response signal issued by the portable unit in response to a transmitted request signal matches a required code content. In the on-vehicle equipment remote control system, the on-vehicle unit transmits the request signal on a first frequency prior to the start of the vehicle power source, and transmits the request signal on a second frequency that is higher than the first frequency after the start of the vehicle power source.

According to another aspect of the invention, a remote control method of an on-vehicle equipment remote control system that includes a portable unit and an on-vehicle unit is provided. This remote control method includes the steps of: the on-vehicle unit transmitting a request signal; the portable unit transmitting a response signal in response to the request signal; and the on-vehicle unit executing a predetermined process when a code content of the response signal matches a required code content.

The on-vehicle unit transmits the request signal on a first frequency prior to the start of a vehicle power source, and transmits the request signal on a second frequency that is higher than the first frequency after the start of the vehicle power source.

According to this on-vehicle equipment remote control system and remote control method for the same, the on-vehicle unit transmits the request signal on the second frequency after the start of the vehicle power source. The second frequency is higher than the first frequency that is transmitted prior to the vehicle power source start. In this configuration, it is difficult for noise generated by the operation of the vehicle power source to superimpose over the request signal, in comparison to a configuration where the request signal after the start of the vehicle power source is transmitted on the same frequency as the request signal prior to the start of the power source. Therefore, regarding the communication between the on-vehicle unit and the portable unit, it is possible to ensure a stable communication area prior to the start of the vehicle power source, and to suppress the incidence of communication errors caused by the operation of the vehicle power source.

BRIEF DESCRIPTION OF THE DRAWINGS

The above and other objects, features, advantages, technical and industrial significance of this invention will be better understood by reading the following detailed description of preferred embodiments of the invention, when considered in connection with the accompanying drawings, in which:

FIG. 2 is a view showing a configuration of a portable unit provided in the on-vehicle equipment remote control system according to embodiments 1 to 3 of the invention;

FIG. 11 is a view that shows a configuration of main parts of the portable unit provided in the system according to a modified example of the embodiment of the invention.

DETAILED DESCRIPTION OF PREFERRED EMBODIMENTS

In the following description and the accompanying drawings, the present invention will be described in more detail in terms of exemplary embodiments.

Figure 1:
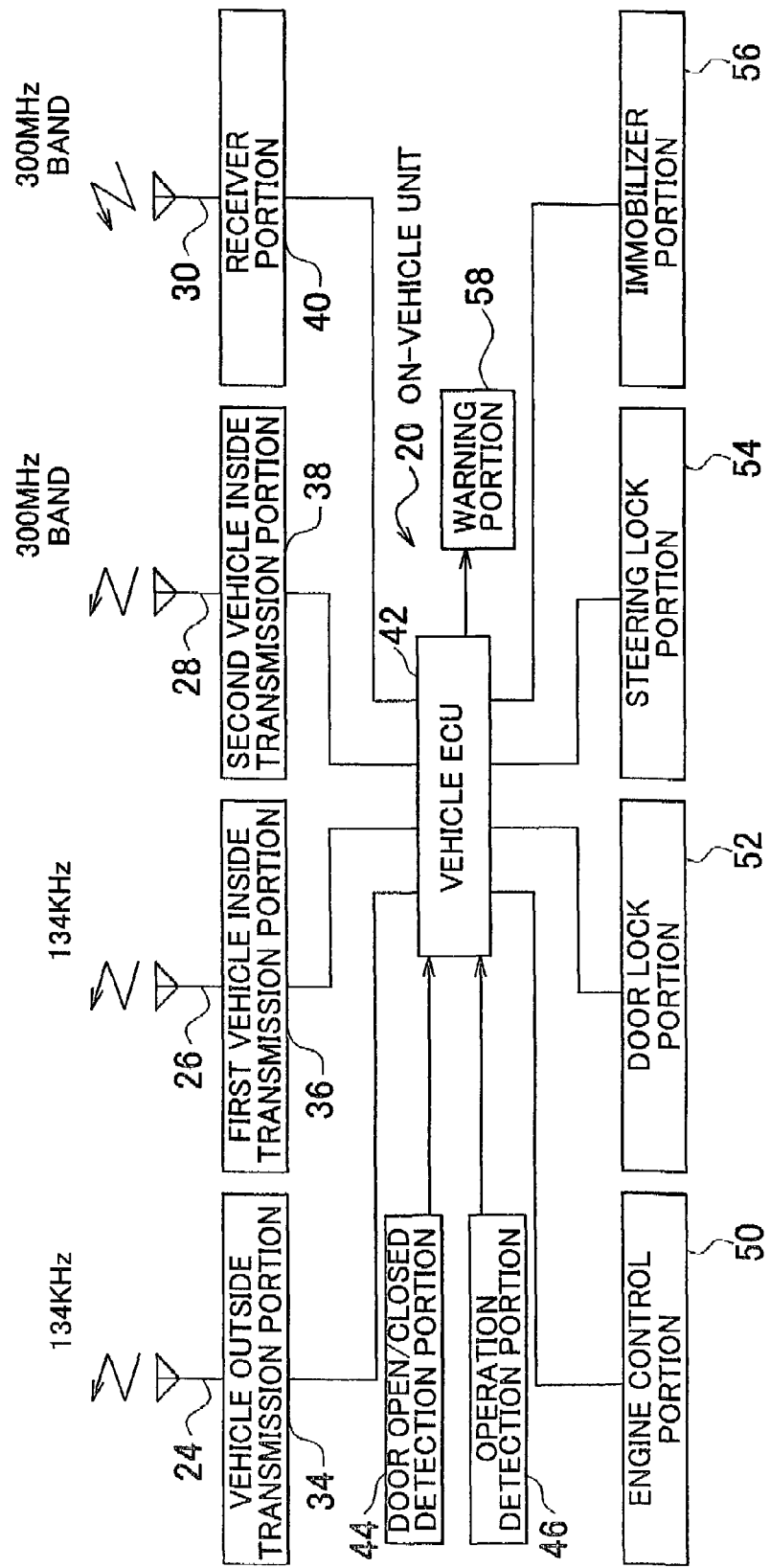
FIG. 1 is a view showing a configuration of an on-vehicle unit provided in an on-vehicle equipment remote control system according to a first embodiment of the invention.

FIG. 1 is a view showing a configuration of an on-vehicle unit 20 provided in an on-vehicle equipment remote control system according to a first embodiment of the invention. FIG. 2 is a view showing a configuration of a portable unit 22 provided in the on-vehicle equipment remote control system. The on-vehicle unit 20 is mounted into a vehicle. The on-vehicle unit 20 controls equipment (explained later) using wireless communication with the portable unit 22 that a vehicle operator carries, without involving an operation by the vehicle operator.

As FIG. 1 shows, the on-vehicle unit 20 has a vehicle outside transmission antenna 24, a first vehicle inside transmission antenna 26, a second vehicle inside transmission antenna 28 and a receiver antenna 30. The vehicle outside antenna 24 is provided, for example, on an outer handle of a manually operated vehicle door that is used when the vehicle operator enters, loads or unloads the vehicle. It has an effective communication area with a radius of, for example, approximately 1 meter from the door outer handle. The first vehicle inside transmission antenna 26 is provided, for example, on a center console floor inside the vehicle. It has an effective communication area that covers the whole of the vehicle inside. The second vehicle inside transmission antenna 28 is provided, for example, on a roof center inside the vehicle. It has an effective communication area that covers the whole of the vehicle inside.

The vehicle outside transmission antenna 24 is connected to a vehicle electrical control unit 42 (hereinafter referred to as "the vehicle ECU 42") through an vehicle outside transmission portion 34. The first vehicle inside transmission antenna 26 is connected to the vehicle ECU 42 through a first vehicle inside transmission portion 36. The second vehicle inside transmission antenna 28 is connected to the vehicle ECU 42 through a second vehicle inside transmission portion 38. The receiver antenna 30 is connected to the vehicle ECU 42 through a receiver portion 40. The vehicle outside transmission portion 34 and the first vehicle inside transmission portion 36 both modulate data supplied from the vehicle ECU 42 into, for example, an LF band 134 kHz frequency signal, and output the signal. The second vehicle inside transmission portion 38 modulates data supplied from the vehicle ECU 42 into, for example, a VHF band or a UHF band 300 MHz frequency signal, and outputs the signal. The receiver portion 40 demodulates, for example a VHF or a UHF band 300 MHz frequency signal transmitted from the portable unit 22 (explained later), into binary data and supplies the demodulated data to the vehicle ECU 42.

A door open/closed detection portion 44 and an operation detection portion 46 are connected to the vehicle ECU 42. The door open/closed detection portion 44 outputs a signal in response to an open/closed status of each door of the vehicle. The vehicle ECU 42 detects the open/closed status of the vehicle doors based on the output signal of the door open/closed detection portion 44. The operation detection portion 46, for example, outputs a signal in response to whether an outer handle of a vehicle door is in operation and also outputs a signal in response to whether an ignition switch, provided in proximity to a seat of the vehicle operator inside the vehicle, is in operation. The vehicle ECU 42 detects whether the outer handle of the vehicle door is in operation and whether the ignition switch is in operation based on the output signals of the operation detection portion 46.

The vehicle ECU 42 is built in with a memory (not shown) that stores an appropriate vehicle ID code and a plurality of mutually different control codes (explained later) for a door lock control, an engine start control, a drive stop control and so on. The vehicle ECU 42 encrypts codes, that include its own ID code and the control codes, at an appropriate time according to the open/closed status of the vehicle door, whether the door outer handle is in operation, whether the ignition switch is in operation and so on, and supplies the encrypted codes to the transmission portions 34, 36 and 38. The vehicle ECU 42 also decrypts the data supplied from the receiver portion 40 and determines whether the code content, such as the ID codes included in the signals match the required code content, such as its own ID code. When the collation is completed, the vehicle ECU 42 executes a process as described hereinafter.

The signal that the vehicle ECU 42 transmits from the vehicle outside transmission antenna 24 through the vehicle outside transmission portion 34 is referred to a vehicle outside request signal. The signals that the vehicle ECU 42 transmits from the first vehicle inside transmission antenna 26 through the first vehicle inside transmission portion 36 and from the second vehicle inside transmission antenna 28 through the second vehicle inside transmission portion 38 are referred to as vehicle inside request signals.

An engine control portion 50, a door lock portion 52, a steering lock portion 54 and an immobilizer portion 56 are connected to the vehicle ECU 42. The engine control portion 50 causes an engine that is a power source of the vehicle to start, using a starter motor, or the like, and also causes the engine operation to stop, based on a command from the vehicle ECU 42. The door lock portion 52 causes all the vehicle doors to lock or unlock, based on a command from the vehicle ECU 42. The steering lock portion 54 permits or prohibits a rotation of a steering wheel that is operated when the vehicle operator is carrying out a vehicle steering operation, based on a command from the vehicle ECU 42. The immobilizer portion 56 permits or prohibits fuel supply to the engine based on a command from the vehicle ECU 42 and also permits or prohibits an ignition operation.

A warning portion 58 is also connected to the vehicle ECU 42. The warning portion 58, based on a command from the vehicle ECU 42, illuminates a warning lamp provided inside the vehicle and operates an alarm speaker to draw the attention of a vehicle occupant to a predetermined warning. The warning portion 58 also operates an alarm speaker provided outside the vehicle to draw the attention of a person positioned around the vehicle to that warning.

As FIG. 2 shows, the portable unit 22 has a first receiver antenna 60, a second receiver antenna 62 and a transmission antenna 64 that has an effective communication area with a radius of, for example, approximately 5 to 10 meters. The first receiver antenna 60, the second receiver antenna 62 and the transmission antenna 64 are connected to a portable electronic control unit 76 (hereinafter referred to as "portable ECU 76") through a first receiver portion 70, a second receiver portion 72 and a transmission portion 74 respectively.

The first receiver portion 70 demodulates the 134 kHz frequency signal transmitted by the on-vehicle unit 20 into binary data, and supplies this data to the portable ECU 76. The second receiver portion 72 demodulates the 300 MHz frequency signals transmitted by the on-vehicle unit 20 into binary data, and supplies this data to the portable ECU 76. The transmission portion 74 modulates the data supplied by the portable ECU 76 into, for example, the VHF or the UHF band 300 MHz signal and outputs the result.

The portable ECU 76 has a code decryption portion 78 and a cryptographic generation portion 80. The portable ECU 76 is also built in with a memory (not shown) that stores a vehicle ID code for its own portable unit 22. The code decryption portion 78 decrypts the binary codes supplied from the first and second receiver portions 70 and 72 using a predetermined cryptographic key. The cryptographic generation portion 80 encrypts codes that include the data acquired from the results decrypted by the code decryption portion 78 and the ID code stored in the memory, and supplies the codes to the transmission portion 74. Hereinafter, a signal that the portable ECU 76 transmits from the transmission antenna 64 through the transmission portion 74 is referred to as a response signal.

Hereinafter, an operation of the on-vehicle equipment remote control system according to this embodiment of the invention will be explained.

Figure 3A:
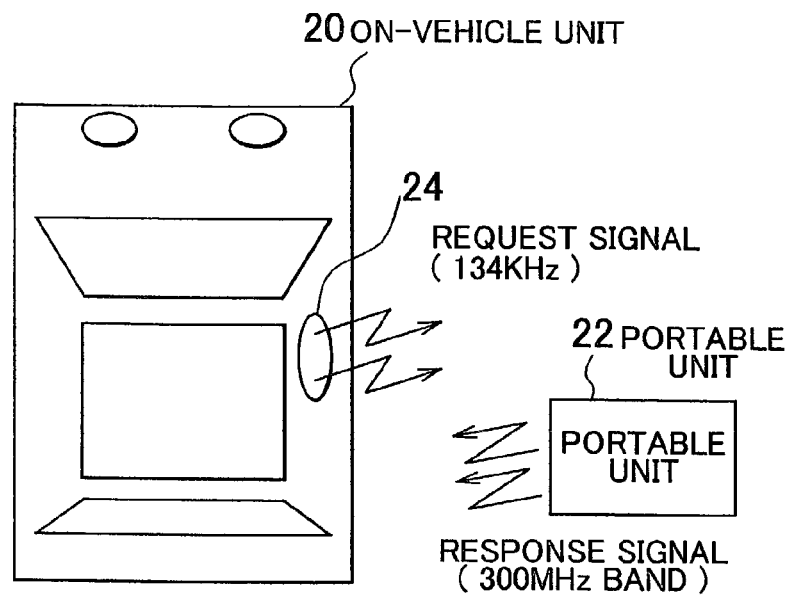
FIG. 3A is a view that explains an operation of the on-vehicle equipment remote control system according to embodiments 1 to 3 of the invention, and shows a case where the portable unit is present outside a vehicle.

FIGS. 3A and B show figures that explain an operation of the on-vehicle equipment remote control system according to this embodiment of the invention. In the system according to this embodiment of the invention, if the outer handle of the vehicle door is operated when the vehicle door is locked, the on-vehicle unit 20, as shown in FIG. 3A, transmits the vehicle outside request signal that includes its own ID code and the control code that instructs the door to unlock from the vehicle outside transmission antenna 24 on the 134 kHz frequency. When the portable unit 22 is not present in the vicinity of the door outer handle of the vehicle, because no response signal is then transmitted from the portable unit 22 to the on-vehicle unit 20, the on-vehicle unit 20 maintains the locked status of the vehicle door.

When the portable unit 22 is present in the vicinity of the door outer handle of the vehicle, however, the portable unit 22 receives the vehicle outside request signal from the on-vehicle unit 20 with the first receiver antenna 60 and, as FIG. 3A shows, responds to this signal by returning the response signal from the transmission antenna 64 on the 300 MHz frequency. When the vehicle door is locked, the on-vehicle unit 20 receives the response signal from the portable unit 22 with the receiver antenna 30 after the vehicle outside request signal is transmitted. When the code content, from the result of the collation of that response signal, does not match the required code content, the on-vehicle unit 20 maintains the vehicle door lock status. When the code content does match the required code content, however, the vehicle door lock status is released and the door is unlocked, through the control of the door lock portion 52, because the prospective vehicle occupant who is carrying the correct portable unit 22 is attempting to enter the vehicle of the prospective vehicle occupant.

Figure 3B:
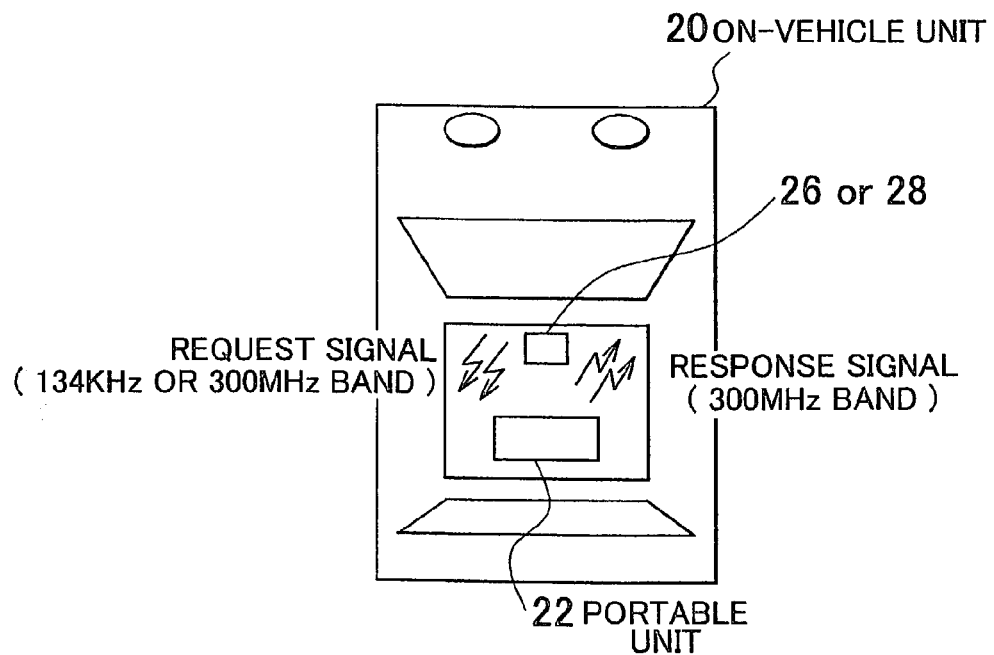
FIG. 3B is a view that explains an operation of the on-vehicle equipment remote control system according to embodiments 1 to 3 of the invention, and shows a case where the portable unit is present inside a vehicle.

After the vehicle door has been unlocked, if the vehicle door is opened or closed and the ignition switch that is provided inside the vehicle is turned on, the on-vehicle unit 20, as shown in FIG. 3B, transmits the vehicle inside request signal that includes its own ID code and the control code that instructs the engine to start, either on the 134 kHz frequency from the first vehicle inside transmission antenna 26 or on the 300 MHz frequency from the second vehicle inside transmission antenna 28. When the portable unit 22 receives the vehicle inside request signal from the on-vehicle unit 20, with the first receiver antenna 60 or second receiver antenna 62, as FIG. 3B shows, the portable unit 22 responds to this signal by returning the response signal on the 300 MHz frequency from the transmission antenna 64.

While the engine is not operating, when the on-vehicle unit 20 does not receive the response signal from the portable unit 22 with the receiver antenna 30 after transmitting the vehicle inside request signal, or, when the response signal is received but the code content does not match the required code content, permission for engine start is not given. When the code content of the response signal received from the portable unit 22 does match the required code content, however, permission for engine start is given because the vehicle operator who is carrying the correct portable unit 22 is attempting to operate the vehicle of the vehicle operator. More specifically, the rotation prohibition for the steering wheel that is controlled by the steering lock portion 54 and the immobilizer lock portion 56 is cancelled, and the state where fuel supply to the engine is prohibited and ignition is also prohibited is cancelled. After this, the starter motor operates under the control of the engine control portion 50 and the engine starts.

In this way, according to the embodiment of the invention, the on-vehicle unit 20 executes the vehicle door unlock control based on whether the response signal has been issued by the portable unit 22 after the on-vehicle unit 20 has transmitted the vehicle outside request signal, and the code content of this response signal, while the vehicle door is locked. Also in this way, according to the embodiment of the invention, the on-vehicle unit 20 also executes the engine start control based on whether the response signal has been issued by the portable unit 22 after the on-vehicle unit 20 has transmitted the vehicle inside request signal, and based on the code content of this response signal, while the engine is not operating. Therefore, according to the system of this embodiment of the invention, unlocking of the vehicle door is possible remotely and without contact, through the communication between the on-vehicle unit 20 and the portable unit 22, without involving operation of the vehicle by the vehicle occupant. Furthermore, engine start can be permitted without inserting a vehicle key into a key cylinder.

In addition, after the engine has been started, the on-vehicle unit 20, as FIG. 3B shows, transmits the vehicle inside request signal that includes its own ID and the control code that instructs carrying out of the process to verify the presence of the portable unit inside the vehicle on the 134 kHz frequency from the first vehicle inside transmission antenna 26 or on the 300 MHz frequency from the second vehicle inside transmission antenna 28 at constant time intervals, or for a constant continuous time after the vehicle door is opened or closed or the like while the vehicle is stopped, or continuously when the door window is open or the like. When the portable unit 22 receives the vehicle inside request signal from the on-vehicle unit 20, with the first receiver antenna 60 or the second receiver antenna 62, as FIG. 3B shows, the portable unit 22 responds to this signal by returning the response signal on the 300 MHz frequency from the transmission antenna 64.

While the engine is operating, if the on-vehicle unit 20 receives the response signal from the portable unit 22 with the receiver antenna 30, after transmitting the vehicle inside request signal, and the code content of that response signal matches the required code content, no process is carried out. When no response signal is received from the portable unit 22, however, or when the response signal is received but the code content does not match the required code content, the warning lamp and the alarm speaker are operated by controlling the warning portion 58 to draw the attention of the vehicle occupant and the person positioned around the vehicle to the fact that the correct portable unit 22 is not present inside the vehicle.

In this way, according to this embodiment of the invention, the on-vehicle unit 20 executes the process to verify whether the portable unit 22 is present inside the vehicle based on whether the response signal has been issued by the portable unit 22 after the on-vehicle unit 20 has transmitted the vehicle inside request signal, and based on the code content of this response signal, when the engine is operating. Therefore, according to the system of this embodiment of the invention, it is possible to prevent the taking away from the vehicle of the portable unit which is necessary for vehicle door lock/unlock control, the engine start control and the like, and which the vehicle operator must carry, and it is possible to avoid the problem where locking or unlocking of the vehicle door or restart of the engine is impossible can be avoided on carrying out of the vehicle door lock/unlock control, the engine start control and the like.

Furthermore, in the system according to this embodiment of the invention, if the ignition is turned off while the engine is operating, the on-vehicle unit 20 causes the engine operation to stop by controlling the engine control portion 50. Then, after the engine operation has been stopped and the vehicle door is opened or closed, or the vehicle operator operates the lock switch (not shown) provided in the proximity of the door outer handle, the on-vehicle unit 20, as FIG. 3A shows, transmits the vehicle outside request signal on the 134 kHz frequency from the vehicle outside transmission antenna 24. When the portable unit 22 has received the vehicle outside request signal from the on-vehicle unit 20 with the first receiver antenna 60, as FIG. 3A shows, the portable unit 22 responds to this request signal by returning the response signal on the 300 MHz frequency from the transmission antenna 64.

While the vehicle door is unlocked, if the on-vehicle unit 20 does not receive the response signal from the portable unit 22 with the receiver antenna 30, after transmitting the vehicle outside request signal, or if the response signal is received but the code content does not match the required code content, the on-vehicle unit 20 maintains the unlocked status of the vehicle door. If the code content of the received response signal does match the required code content, however, the vehicle door unlocked status is cancelled and the door is locked, by controlling the door lock portion 52, because the vehicle occupant who is carrying the correct portable unit 22 is attempting to leave his or her own vehicle.

In this way, according to the embodiment of the invention, the on-vehicle unit 20 executes the vehicle door lock control based on whether the response signal has been issued by the portable unit 22 after the on-vehicle unit 20 has transmitted the vehicle outside request signal, and based on the code content of this response signal, while the vehicle door is not locked. Therefore, according to the system of this embodiment of the invention, locking of the vehicle door is possible remotely and without contact, through the communication between the on-vehicle unit 20 and the portable unit 22, without involving the operation of a portable unit or a mechanical key by the vehicle occupant.

Figure 4A:
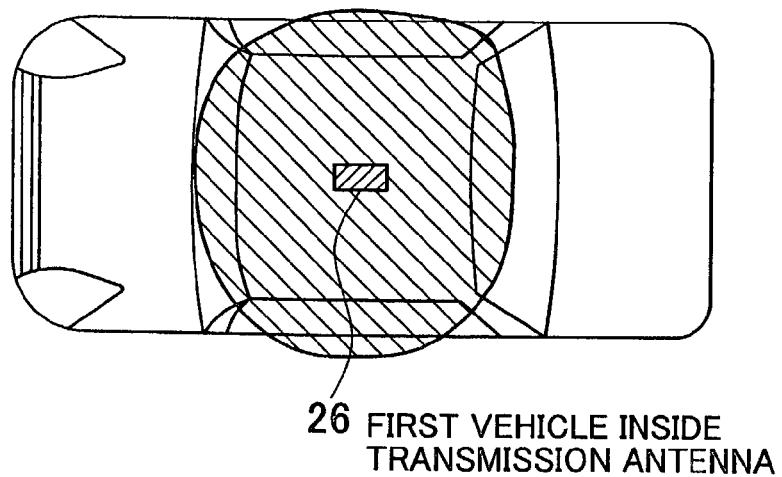
FIG. 4A is a view that shows an effective transmission area for a first vehicle inside transmission antenna that transmits a vehicle inside request signal using a comparatively low frequency.
Figure 4B:
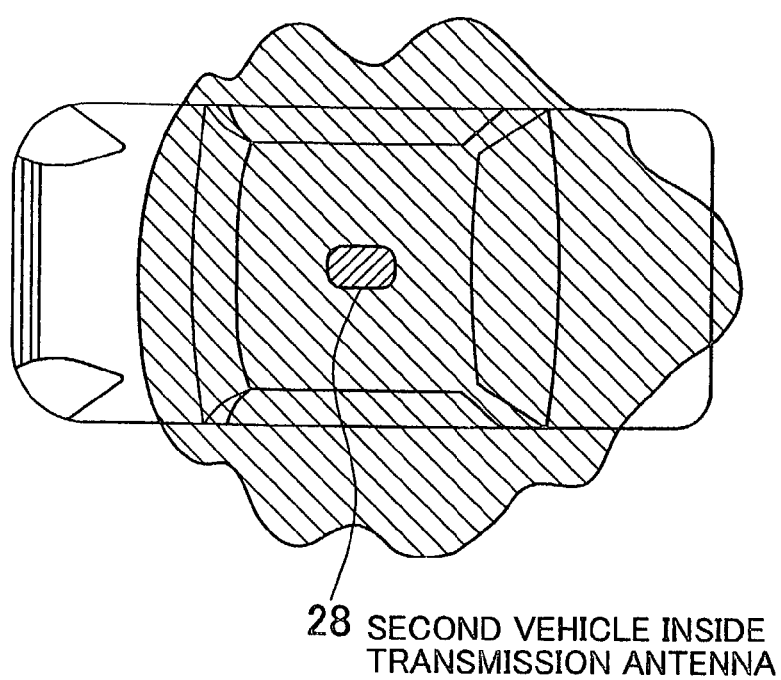
FIG. 4B is a view that shows an effective transmission area for a second vehicle inside transmission antenna that transmits a vehicle inside request signal using a comparatively high frequency.
Figure 5:
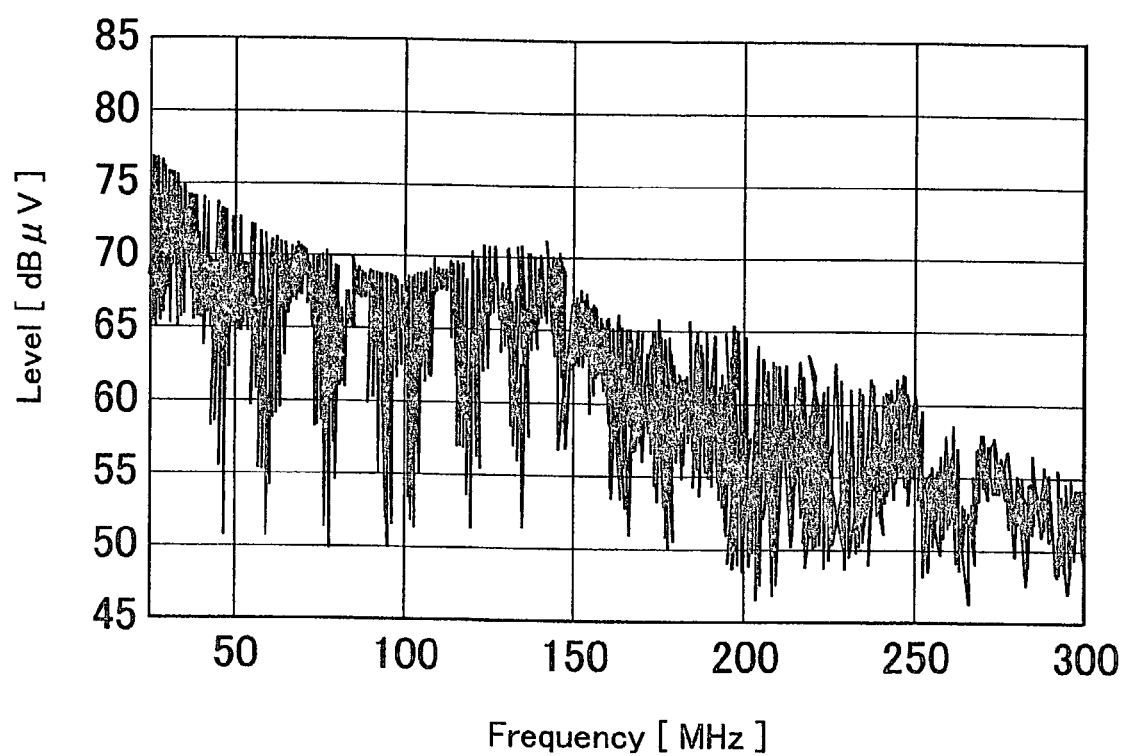
FIG. 5 is a view that shows energy levels for frequencies of noise generated by an engine operation.

FIGS. 4A and B are example figures that compare an effective transmission area of the first vehicle inside transmission antenna 26 that transmits vehicle inside request signals on the 134 kHz frequency (shown by the slanted lines in FIG. 4A) with an effective transmission area of the second vehicle inside transmission antenna 28 that transmits vehicle inside request signals on the 300 MHz frequency (shown by the slanted lines in FIG. 4B). FIG. 5 is a figure that shows an example of energy levels at different frequencies of noise generated from engine operation.

The higher a frequency of a radio wave is, in other words, the shorter the wavelength of the signal is, the stronger its directional stability becomes, the weaker its turnaround is, and the easier it is to attenuate it. For this reason if a communication from the on-vehicle unit 20 to the portable unit 22 (hereinafter referred to as a "downlink communication") utilizes the comparatively low frequency radio wave through the first vehicle inside transmission antenna 26, as FIG. 4A shows, it is not affected by a person or the vehicle body and a stable effective communication area can be ensured. If the downlink communication utilizes the comparatively high frequency radio wave through the second vehicle inside transmission antenna 28 in an attempt to achieve an effective communication area that covers the whole of the vehicle inside, however, as FIG. 4B shows, a stable circular (three-dimensionally spherical) effective communication area cannot be ensured and leakage to the vehicle outside is generated.

The downlink communication from the on-vehicle unit 20 to the portable unit 22 inside the vehicle is carried out on execution of the engine start control and on execution of a presence verification process that verifies whether the portable unit 22 is present inside the vehicle. The engine start control includes steering lock release, immobilizer release and engine start. Therefore, high security is demanded for the communication between the on-vehicle unit 20 and the portable unit 22, and it is preferable that an effective communication area with few leaks to the vehicle outside be ensured. Therefore, when the engine start control is carried out in this system, it is preferable that the downlink communication from the on-vehicle unit 20 to the portable unit 22 ensures this high security by utilizing the comparatively low frequency radio wave from the first vehicle inside transmission antenna 26 instead of the comparatively high frequency radio wave from the second vehicle inside transmission antenna 28.

In the system according to this embodiment of the invention, however, the presence verification process that verifies whether the portable unit 22 is present inside the vehicle is carried out while the engine is operating. When the engine is operating, broad band noise such as ignition noise and motor noise and the like is generated. The lower the frequency of this kind of noise, as FIG. 5 shows, the larger its energy is. Therefore, the lower the communication frequency between the on-vehicle unit 20 and the portable unit 22 (in other words, the frequency of the request signal transmitted from the on-vehicle unit 20 and the portable unit 22), the easier it becomes for that radio wave to be superimposed by the noise. Therefore, if the downlink communication that is carried out after start of the engine is carried out utilizing the comparatively low frequency, the effective communication area of both units becomes narrow and it becomes easier for communication errors to be generated, due to the noise generated by the operation of the engine.

If the downlink communication during the engine operation utilizes the comparatively high frequency radio wave, it is difficult for the noise generated by the engine operation to superimpose the radio wave. Therefore, it becomes difficult for communication errors to be generated between the on-vehicle unit 20 and the portable unit 22. In other words, it is appropriate that, prior to the start of the engine, that is while the engine is not operating, the 134 kHz frequency radio wave from the first vehicle inside transmission antenna 26 is utilized for the downlink communication from the on-vehicle unit 20 to the portable unit 22. It is appropriate that after the start of the engine, that is when the engine is operating, however, the 300 MHz frequency radio wave from the second vehicle inside transmission antenna 28 is utilized for the downlink communication from the on-vehicle unit 20 to the portable unit 22.

Thus, in the system according to this embodiment of the invention, the frequencies utilized for the downlink communication from the on-vehicle unit 20 to the portable unit 22 inside the vehicle are different for the execution of the engine start control and the execution of the presence verification process for the portable unit 22. Hereafter, a characteristic of the system according to this embodiment of the invention will be explained with reference to FIG. 6.

Figure 6:
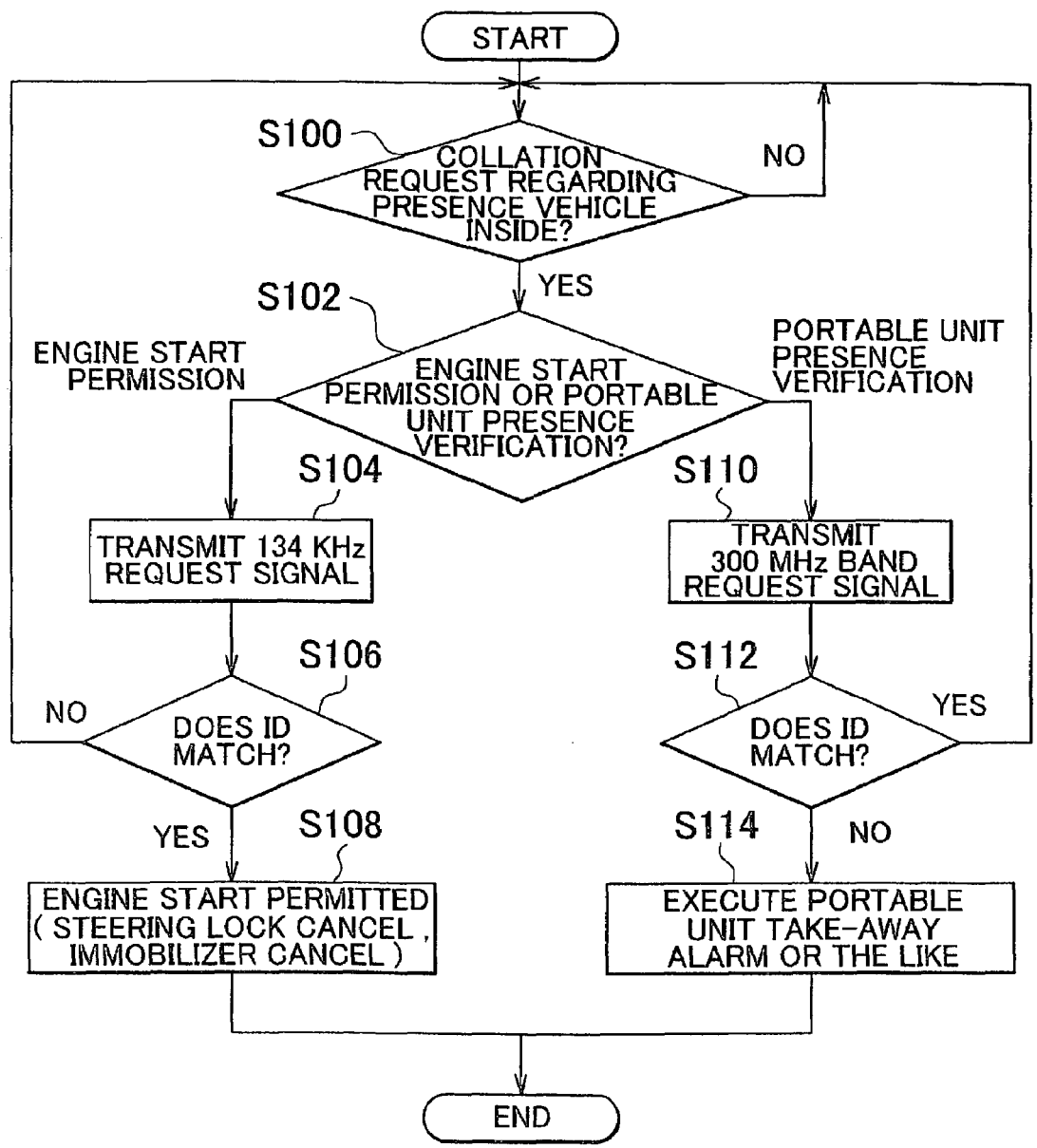
FIG. 6 is a flow chart of a control routine executed by the on-vehicle unit provided in the system according to the first embodiment of the invention.

FIG. 6 is an example flowchart that shows a control routine executed by the vehicle ECU 42 in the on-vehicle unit 20 of this embodiment of the invention for achieving the aforementioned function. The routine shown in FIG. 6 starts up each time the processes it contains are completed. When the routine shown in FIG. 6 starts up, a process in Step 100 is executed first.

In Step 100, determination is carried out as to whether there has been a collation request for the code content through communication between the on-vehicle unit 20 and the portable unit 22 inside the vehicle compartment, due to a request that the engine start control or the presence verification process that verifies whether the portable unit 22 is present inside the vehicle be executed. The process in Step 100 is repeated until a positive determination is made. When the positive determination is made, a process in Step 102 is executed next.

In Step 102, it is determined whether a collation for the code content has been requested, or to execute the process that verifies whether the portable unit 22 is present inside the vehicle. As a result, when it is determined that the engine start control has been requested, a process in Step 104 is executed next. When it is determined that the presence verification process for the portable unit 22 has been requested, however, a process in Step 106 is executed next.

In Step 104, the codes, including the ID code of the vehicle owner and the control code that instructs engine start are encrypted and modulated to the 134 kHz frequency signal by being supplied to the first vehicle inside transmission portion 36. Then, the process is executed to transmit this signal from the first vehicle inside transmission antenna 26 as the vehicle inside request signal.

In Step 106, after the vehicle inside request signal in Step 104 has been transmitted, it is determined whether the code content of the response signal returned from the portable unit 22 matches the required code content. As a result, when the code content of the received response signal does not match the required code content, or when a response signal is not received from the portable unit 22, the processes in Step 100 and the subsequent steps are repeated. If the code content of the received response signal does match the required code content, however, a process in Step 108 is executed next.

In Step 108, the processes to permit engine start are executed, through supply of a command signal to the engine control portion 50, the steering lock portion 54 and the immobilizer portion 56. More specifically, the engine is cranked and is started by canceling the steering wheel rotation prohibition, canceling of the state prohibiting fuel supply to the engine and ignition, and operating the starter motor. After the process in this Step 108 has been executed, the engine is in operating status. When the process in Step 108 is completed, this routine is completed.

In Step 110, however, the codes, including the ID code of the vehicle owner and the control code that instructs presence verification of the portable unit 22 are encrypted and modulated to the 300 MHz frequency signal by being supplied to the second vehicle inside transmission portion 38. Then, the process is executed to transmit this signal from the second vehicle inside transmission antenna 28 as the vehicle inside request signal.

In Step 112, after the vehicle inside request signal in Step 110 has been transmitted, it is determined whether the code content of the response signal returned from the portable unit 22 matches the required code content. As a result, if it is determined that the code content of the response signal matches the required code content, the processes in Step 100 and the subsequent steps are repeated. If it is determined that the code content of the received response signal does not match the required code content, however, a process in Step 114 is executed next.

In Step 114, the process to draw the attention of the vehicle occupant and the person positioned around the vehicle to the fact that the correct portable unit 22 is not present inside the vehicle is executed, through supply of a command signal to the warning portion 58. More specifically, the warning lamp provided inside the vehicle lights up and the alarm speakers provided inside and outside the vehicle issue audio messages such as, "the portable unit 22 has been taken away out of the vehicle." After the process in Step 114 has been executed, this routine is completed.

According to the routine shown in FIG. 6, when the downlink communication from the on-vehicle unit 20 to the portable unit 22 is carried out inside the vehicle, it is possible to utilize mutually different communication frequencies for when execution of the engine start control is carried out and for when execution of the presence verification process for the portable unit 22 is carried out. More specifically, when the engine start control is being executed while the engine is not operating, it is possible to utilize the comparatively low 134 kHz frequency radio wave for the downlink communication from the on-vehicle unit 20 to the portable unit 22. On the other hand, when the vehicle inside presence verification process of the portable unit 22 is being executed while the engine is operating, it is possible to use the comparatively high 300 MHz frequency radio wave, which is at least three digits different from the LF band frequency.

As stated above, the lower the frequency of the noise that is generated on engine operating, the larger its energy is. Therefore, the lower the communication frequency between the on-vehicle unit 20 and the portable unit 22, the easier it becomes for that radio wave to be superimposed by the noise. According to this embodiment of the invention, however, the downlink communication between the on-vehicle unit 20 and the portable unit 22 that takes place after the engine operation has been started utilizes a higher frequency signal than the downlink communication that takes place prior to the engine operation being started, as stated above. Therefore, it becomes difficult for the noise generated by the operation of the engine to superimpose over the vehicle inside request signal from the on-vehicle unit 20 to the portable unit 22. Therefore, according to this embodiment of the invention, it is possible to suppress the generation of communication errors in the communication between the on-vehicle unit 20 and the portable unit 22 caused by operation of the engine when executing the process to verify whether the portable unit 22 is present inside the vehicle.

Furthermore, according to this embodiment of the invention, the downlink communication prior to the engine being started utilizes the comparatively low frequency radio wave. While the engine is not operating, no noise is generated from this source. Even if the downlink communication between the on-vehicle unit and the portable unit 22 utilizes the low frequency radio wave, no communication errors are caused by the noise from the engine operation. Furthermore, when the communication utilizes the low frequency radio wave, as the attenuation of the radio wave is strong, the person or the vehicle body does not have a large effect, and the stable communication area can be ensured.

In this way, according to the system in this embodiment of the invention, regarding the communication between the on-vehicle unit 20 and the portable unit 22, it is possible to ensure the stable communication area prior to the start of the engine, and to suppress communication errors caused by engine operation after the engine has been started. Therefore, when the engine start control is carried out using the communication between the on-vehicle unit 20 and the portable unit 22, high security can be ensured, and the process to verify whether the portable unit 22 is present inside the vehicle can be carried out with a high degree of accuracy.

Next, a second embodiment of the invention will be explained with reference to FIG. 7 and the aforementioned FIGS. 1 and 2. A system according to this embodiment of the invention is realized through execution of a routine shown in FIG. 7 by the vehicle ECU 42 of the on-vehicle unit 20 in the configurations shown in FIGS. 1 and 2.

According to the first embodiment of the invention, the downlink communication from the on-vehicle unit 20 to the portable unit 22 that takes place on execution of the engine start control prior to the start of the engine utilizes only the low frequency radio wave (134 kHz). According to the second embodiment of the invention, the on-vehicle unit 20 is able to communicate utilizing both the comparatively low frequency radio wave (134 kHz) and the high frequency radio wave (300 MHz). Furthermore, taking into consideration that the portable unit 22 is able to receive both radio waves, the downlink communication utilizes both the low frequency radio wave and the high frequency radio wave on execution of the engine start control.

Figure 7:
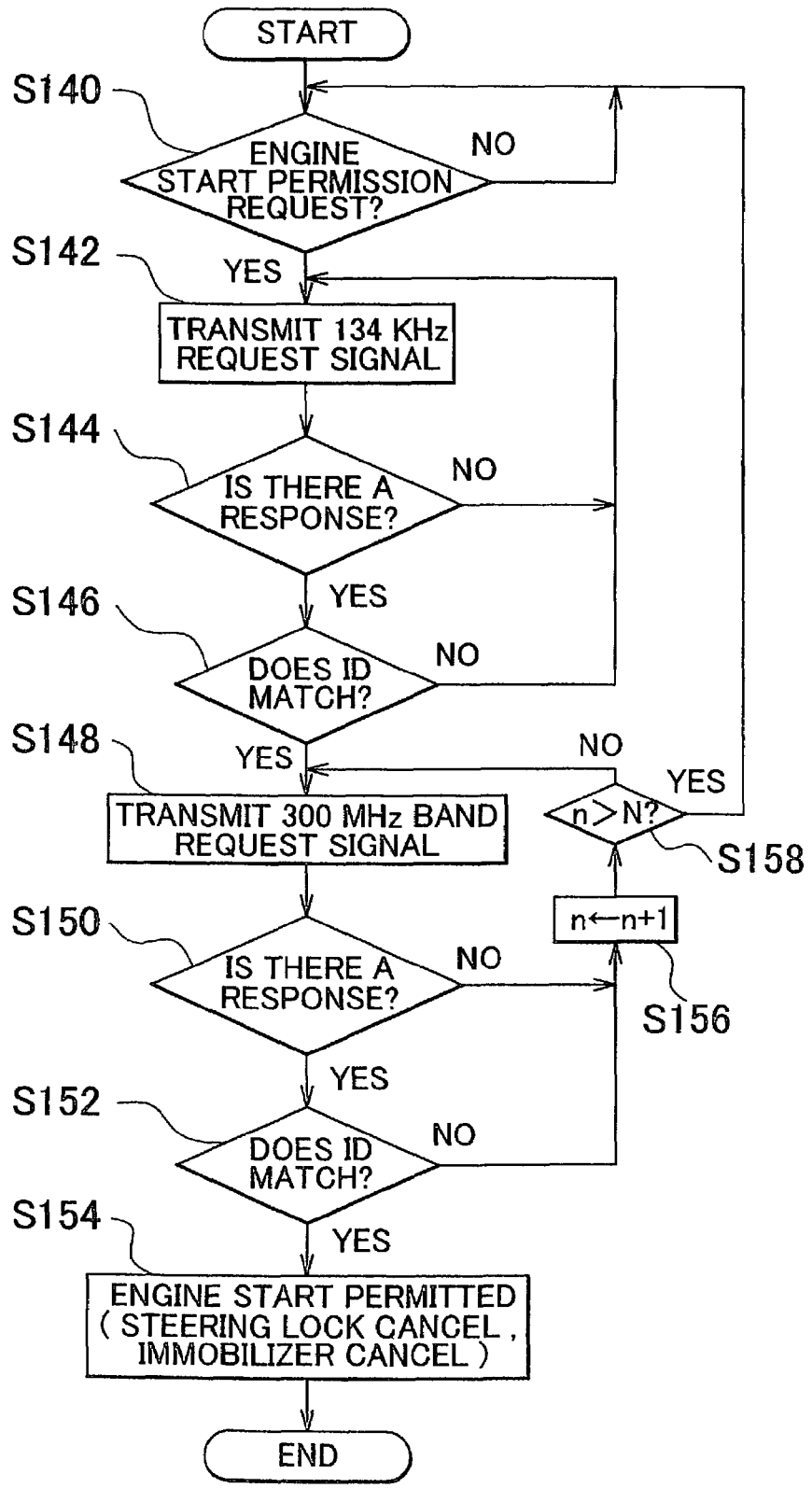
FIG. 7 is a flow chart of a control routine executed by the on-vehicle unit provided in the system according to the second embodiment of the invention.

FIG. 7 is an example flowchart that shows a control routine executed by the vehicle ECU 42 in this embodiment of the invention for executing the engine start control. The routine shown in FIG. 7 starts up each time the processes it contains are completed. When the routine shown in FIG. 7 starts up, a process in Step 140 is executed first.

In Step 140, engine start is permitted. Determination is carried out as to whether execution of the engine start control has been requested. The process in this Step 140 is repeated until a positive determination is made. When the positive determination is made, a process in Step 142 is executed next.

In Step 142, the codes, including the ID code of the vehicle owner and the control code that instructs engine start are encrypted and modulated to the 134 kHz frequency signal by being supplied to the first vehicle inside transmission portion 36. Then, the process is executed to transmit this signal from the first vehicle inside transmission antenna 26 as the vehicle inside request signal.

In Step 144, after the 134 kHz frequency vehicle inside request signal in Step 142 has been transmitted from the first vehicle inside transmission antenna 26, it is determined whether the response signal has been returned from the portable unit 22. As a result of this determination, if the response signal has been returned, a process in Step 146 is executed next. In Step 146, it is determined whether the code content of the returned response signal matches the required code content. As a result, when the code content matches the required code content, a process in Step 148 is executed next.

On the other hand, in Step 144, when the response signal from the portable unit 22 has not yet been returned, or, in Step 146, when the code content of the returned response signal does not match the required response signal, the process in Step 142 is repeated.

In Step 148, the codes, including the ID code of the vehicle owner and the control code that instructs engine start are encrypted and modulated to the 300 MHz frequency signal by being supplied to the second vehicle inside transmission portion 38. Then, the process is executed to transmit this signal from the second vehicle inside transmission antenna 28 as the vehicle inside request signal.

In Step 150, after the 300 MHz frequency vehicle inside request signal in Step 148 has been transmitted from the second vehicle inside transmission antenna 28, it is determined whether the response signal has been returned from the portable unit 22. As a result of this determination, if the response signal has been returned, a process in Step 152 is executed next. In Step 152, it is determined whether the code content of the returned response signal matches the required code content. As a result, when the code content matches the required code content, a process in Step 154 is executed next.

In Step 154, the process to permit engine start is executed, through supply of a command signal to the engine control portion 50, the steering lock portion 54 and the immobilizer portion 56. More specifically, the engine is cranked and is started through the cancellation of the state prohibiting steering wheel rotation, the cancellation of the state prohibiting fuel supply to the engine and ignition, and operating the starter motor. After the process in Step 154 has been executed, the engine is in operating status. When the process in this Step 154 is completed, this routine is completed.

On the other hand, in Step 150, when the response signal from the portable unit 22 has not yet been returned, or, in Step 152, when the code content of the returned response signal does not match the required response signal, a process in Step 156 is executed next.

In Step 156, the process is executed whereby a counter (n) increments only in units of "1". Note that the counter (n) is a count of the downlink communications that have taken place after the code content of the response signal from the portable unit 22 matched the required code content, as a result of the downlink communication from the on-vehicle unit 20 to the portable unit 22 that took place utilizing the 134 kHz frequency radio wave, up to the point where the code content of the response signal from the portable unit 22 matched the required code content, as a result of the downlink communication from the on-vehicle unit 20 to the portable unit 22 that took place utilizing the 300 MHz frequency radio wave.

In Step 158, determination is made as to whether the counter (n) has exceeded a predetermined count (N). Note that the predetermined count (N) is a maximum count value for the downlink communications that utilized the 300 MHz frequency radio wave executed after the collation of the downlink communication that utilized the 134 kHz frequency radio wave has been completed. It may be pre-set to, for example a count of 3 or the like. When it is determined that the result (n)>(N) has not been achieved, Step 148 and the subsequent steps are executed. When it is determined that the result (n)>(N) has been achieved, however, execution of the process to permit start of the engine in Step 154 is not carried out, and the processes in Step 140 and the subsequent steps are executed again.

According to the routine shown in FIG. 7, while the engine is not operating, the collation of the downlink communication between the on-vehicle unit 20 and the portable unit 22 that utilized the 134 kHz frequency radio wave is completed and, after this, when the collation of the downlink communication between the on-vehicle unit 20 and the portable unit 22 that utilized the 300 MHz frequency radio wave is completed, it is possible to permit start of the engine.

While the engine is not operating, there is no noise generated from this source. Even if the downlink communication between the on-vehicle unit 20 and the portable unit 22 utilizes the low frequency radio wave, no communication errors are caused by noise from the engine operation. Furthermore, if start permission for the engine is made when all the collation is completed from the respective downlink communications carried out on the mutually different communication frequencies, the collation between the on-vehicle unit 20 and the portable unit 22 on execution of the engine start control becomes complicated. Therefore, according to the system in this embodiment of the invention, when the engine start control is carried out using the communication between the on-vehicle unit 20 and the portable unit 22, communication errors caused by engine operation are not generated, and it is possible to ensure high security.

Next, a third embodiment of the invention will be explained with reference to FIG. 8 and the aforementioned FIGS. 1, 2 and 7. A system according to this embodiment of the invention is realized through execution of a routine shown in FIG. 8 in place of the routine shown in FIG. 7 by the vehicle ECU 42 of the on-vehicle unit 20 in the configurations shown in FIGS. 1 and 2.

According to the second embodiment of the invention, unless the collation of the downlink communication that utilized the 134 kHz frequency radio wave is completed and, after that, the collation of the downlink communication that utilized the 300 MHz frequency radio wave is completed, then engine start is not permitted. According to the third embodiment of the invention, at the point when the collation of the downlink communication that utilized the 134 kHz frequency radio wave is completed, engine start is permitted and the collation of the downlink communication that utilized the 300 MHz frequency radio wave is carried out in order to verify that engine start permission.

Figure 8:
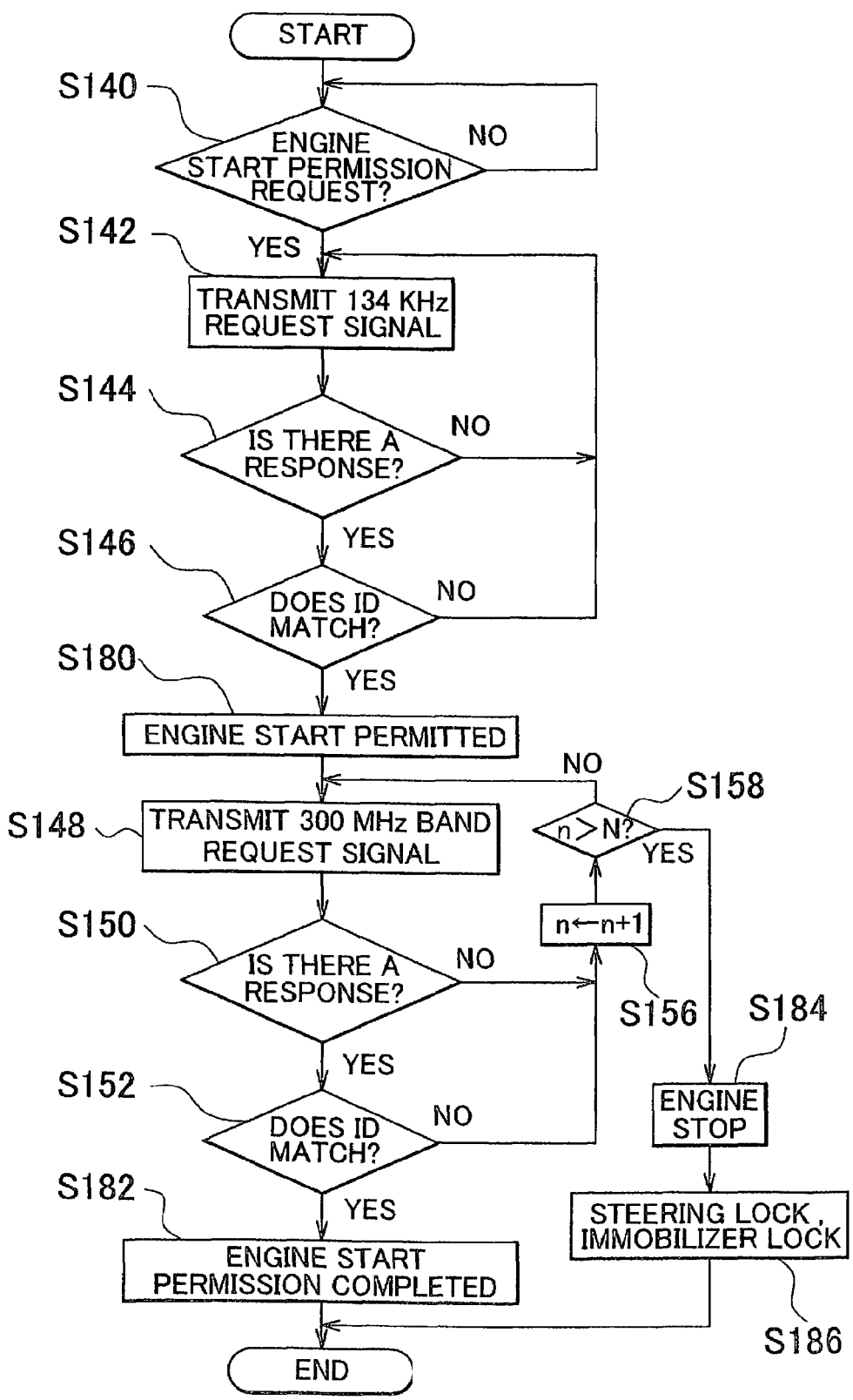
FIG. 8 is a flow chart of a control routine executed by the on-vehicle unit provided in the system according to the third embodiment of the invention.

FIG. 8 is an example flowchart that shows a control routine executed by the vehicle ECU 42 in this embodiment of the invention for executing the engine start control. The routine shown in FIG. 8 starts up each time the processes it contains are completed. Note that in FIG. 8, the same step numbers are attached for the steps that execute the same processes as the steps shown in FIG. 7. The explanation of these steps will be abbreviated or simplified.

In other words, in the routine shown in FIG. 8, after the 124 kHz frequency vehicle inside request signal in Step 142 is transmitted from the first vehicle inside transmission antenna 26, when it is determined that the code content of the response signal returned from the portable unit 22 in response to the 134 kHz frequency vehicle inside request signal in Step 136 matches the required code content, a process in Step 180 is executed next.

In Step 180, the same as in Step 154 according to the second embodiment of the invention, the process to permit engine start is executed through supply of a command signal to the engine control portion 50, the steering lock portion 54 and the immobilizer portion 56. More specifically, the engine is cranked and is started by canceling the state prohibiting steering wheel rotation, canceling the state prohibiting fuel supply to the engine and ignition, and operating the starter motor. After the process in Step 180 has been executed, the engine is in operating status. When the process in Step 180 is completed, the process in Step 148 is executed next and the 300 MHz frequency vehicle inside request signal is transmitted from the second vehicle inside transmission antenna 28.

Therefore, when it is determined that the code content of the response signal returned from the portable unit 22 in response to the 300 MHz frequency vehicle inside request signal in Step 152 matches the required code content, a process in Step 182 is executed next. In Step 182, the engine start permission process is completed because the engine start permission as carried out in Step 180 is considered to be legitimate, and subsequently the process to continue engine operating is carried out. When the process in this Step 182 is completed, this routine is completed.

Furthermore, if it is determined in Step 158 that the counter (n) has exceeded the predetermined count (N), then a process in Step 184 is carried out next. In Step 184, the process that stops engine operation is carried out through controlling the engine control portion 50. In Step 186, the processes that prohibit fuel supply to the engine, ignition and rotation of the steering wheel are executed by controlling the immobilizer portion 56 and the steering wheel lock portion 54. If the processes in Steps 184 and 186 are carried out, the engine then enters the non-operating state. When the process in Step 186 is completed, this routine is completed.

According to the routine shown in FIG. 8, while the engine is not operating, engine start can be permitted at the point when the collation of the downlink communication between the on-vehicle unit 20 and the portable unit 22 that utilized the 134 kHz frequency radio wave is completed. Furthermore, after that, the collation of the downlink communication between the on-vehicle unit 20 and the portable unit 22 that utilized the 300 MHz frequency radio wave can be utilized for verification of that engine start permission. More specifically, when the code content matches after the collation of the downlink communication that utilized the 300 MHz frequency radio wave, engine operation is continued as it is. When the code content does not match, however, engine operation can be stopped.

In other words, in the configuration that gives permission for engine start when the collation of the downlink communication that utilized the 134 kHz frequency radio wave and the collation of the downlink communication that utilized the 300 MHz frequency radio wave are both completed, a time of, for example, approximately 200 ms to 400 ms is required from the start of the communication between the on-vehicle unit 20 and the portable unit 22 until engine start permission is given. According to this embodiment of the invention, however, because engine start permission is given if only one of the collation operations is completed, it is possible to reduce the aforementioned time by approximately half, and it is therefore possible to shorten the start time of the engine start permission.

Furthermore, in this configuration, because engine operation stops when one of the collation operations is not completed, the difficulty of the collation between the on-vehicle unit 20 and the portable unit 22 is maintained. Therefore, according to the system in this embodiment of the invention, when engine start control is carried out using the communication between the on-vehicle unit 20 and the portable unit 22, high security is ensured and it is possible to avoid delaying the start of the engine start control.

Note that, on execution of the engine start control using the communication between the on-vehicle unit 20 and the portable unit 22, it is conceivable that the collation is carried out of the downlink communication that utilized the 300 MHz frequency radio wave first, and then after that, the collation is carried out of the downlink communication that utilized the 134 kHz frequency radio wave. In that configuration, engine start permission is given at the point when the collation of the 300 MHz frequency radio wave is completed, and the collation of the 134 kHz frequency radio wave is utilized as a verification of the engine start permission. In this configuration, however, because the downlink communication that utilized the 134 kHz frequency radio wave is carried out after the engine has started to operate, it is easy for noise generated from operation of the engine to superimpose the vehicle inside request signal transmitted from this downlink communication, and it is easy for communication errors to be generated.

However, according to this embodiment of the invention, on execution of the engine start control using the communication between the on-vehicle unit 20 and the portable unit 22, the collation of the downlink communication that utilized the 134 kHz frequency radio wave is carried out first, and then after that, the collation is carried out of the downlink communication that utilized the 300 MHz frequency radio wave. Therefore, it becomes difficult for the noise generated from the operation of the engine to superimpose the vehicle inside request signal transmitted from this downlink communication, and it becomes difficult for communication errors to be generated. Thus, in the system according to this embodiment of the invention, on execution of the engine start control using the communication between the on-vehicle unit 20 and the portable unit 22, it is possible to ensure high security while suppressing communication errors and to avoid delay in the execution start of the engine start control.

Referring back to embodiments 1 to 3 of the invention, the code decryption portion 78 in the portable ECU 76 of the portable unit 22 decrypts each request signal that is transmitted from the on-vehicle unit 20 using the designated cryptographic key, and the cryptographic generation portion 80 in the portable ECU 76 encrypts the codes, including this decrypted data. At this time, however, the decryption and code generation of the request signal on the 134 kHz frequency radio wave, as well as the decryption and code generation of the request signal on the 300 MHz frequency radio wave may be carried out using a common cryptographic key and a common cryptographic algorithm (cryptographic computing expression). In this configuration, the code decryption portion 78 and the cryptographic generation portion 80 are simplified. Therefore, when both members are provided on an IC chip, the IC chip has a reduced size, and when software is created for both members, the processes involved are more efficient.

Figure 9:
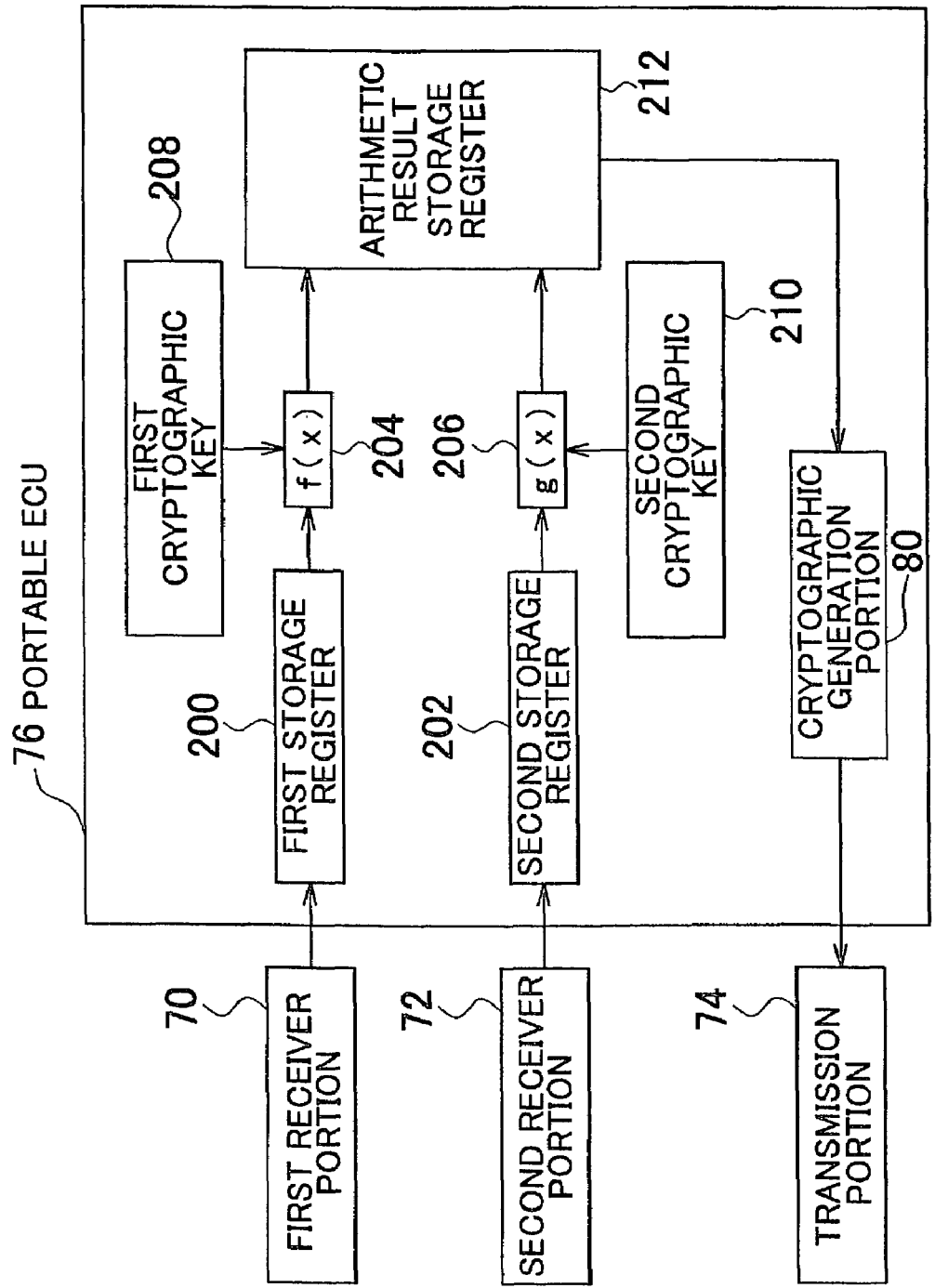
FIG. 9 is a view that shows a configuration of main parts of the portable unit provided in the system according to a modified example of the embodiment of the invention.

Furthermore, at this time, it is also possible to utilize mutually different cryptographic keys and different cryptographic computing expressions for decryption and code generation of each of the two types of request signals respectively. FIG. 9 shows a configuration of main parts of the portable unit 22 provided in the system according to a modified example of the invention. Note that, in FIG. 9, the same reference symbols are attached for the portions that are the same as in the configuration shown in FIG. 2. The explanation of these portions will be abbreviated.

In other words, the portable ECU 76 of the portable unit 22 includes a first storage register 200 that connects to the first receiver portion 70, and a second storage register 202 that connects with the second receiver portion 72. The first storage register 200 stores binary data supplied from the first receiver portion 70 that demodulates the 134 kHz frequency signal. The second storage register 202 stores binary data supplied from the second receiver portion 72 that demodulates the 300 MHz frequency signal. A first cryptographic computing portion 204 is connected to the first storage register 200, and a second cryptographic computing portion 206 is connected to the second storage register 202. Furthermore, a first cryptographic key 208 is connected to the first cryptographic computing portion 204, and a second cryptographic key 210 is connected to the second cryptographic computing portion 206. The first cryptographic computing portion 204 and the second cryptographic computing portion 206 include mutually different cryptographic computing expressions (functions), $f(x)+g(x)$. Furthermore, the first cryptographic key 208 and the second cryptographic key 210 include mutually different cryptographic code information. The first and second cryptographic computing portions 204 and 206 are each connected to the cryptographic generation portion 80 through an arithmetic result storage register 212.

In this configuration, the data stored inside the first storage register 200 and the data stored inside the second storage register 202 are decrypted utilizing the mutually different cryptographic keys and the different cryptographic computing expressions. The decrypted data is supplied to the cryptographic generation portion 80 after being supplied to the arithmetic result storage register 212, and are then transmitted to the on-vehicle unit 20 from the transmission portion 74. In this event, because the request signal on the 134 kHz frequency radio wave and the request signal on the 300 MHz frequency radio wave are decrypted and codes for the request signals are generated utilizing the mutually different cryptographic keys and the different cryptographic computing expressions, decrypting and code generation for both request signals is made complicated. Therefore, according to the configuration shown in FIG. 9, high security can be ensured for the communication between the on-vehicle unit 20 and the portable unit 22.

Note that in the configuration shown in FIG. 9, the cryptographic computing expressions $f(x)+g(x)$ are mutually different items, but they may be identical to each other, that is $f(x)=g(x)$. In this case, because the first cryptographic computing portion 204 and the second cryptographic computing portion 206 can be the same portion, the code decryption portion 78 can be simplified.

Furthermore, if decryption and code generation of the request signal is carried out utilizing the cryptographic computing expressions, a nonlinear function that outputs irregular data for an input code may be used for these cryptographic computing expressions. In this case, because the data that is obtained as a result of the cryptographic computing is not regular in relation to the input code, the decryption and code generation for the request signal is made complicated, and high security can be ensured for the communication between the on-vehicle unit 20 and the portable unit 22.

In the above embodiments 2 and 3 of the invention, on implementation of the engine start control, the downlink communication between the on-vehicle unit 20 and the portable unit 22 is carried out first utilizing the 134 kHz frequency radio wave and then, after the collation of that downlink communication is completed, utilizing the 300 MHz frequency radio wave. The downlink communications, however, may take place at the same time utilizing both frequency radio waves. In this case, the on-vehicle unit 20 transmits the 134 kHz frequency request signal and the 300 MHz frequency request signal, which include the mutually different code contents, at the same time. The portable unit 22 receives both request signals at the same time.

Figure 10:
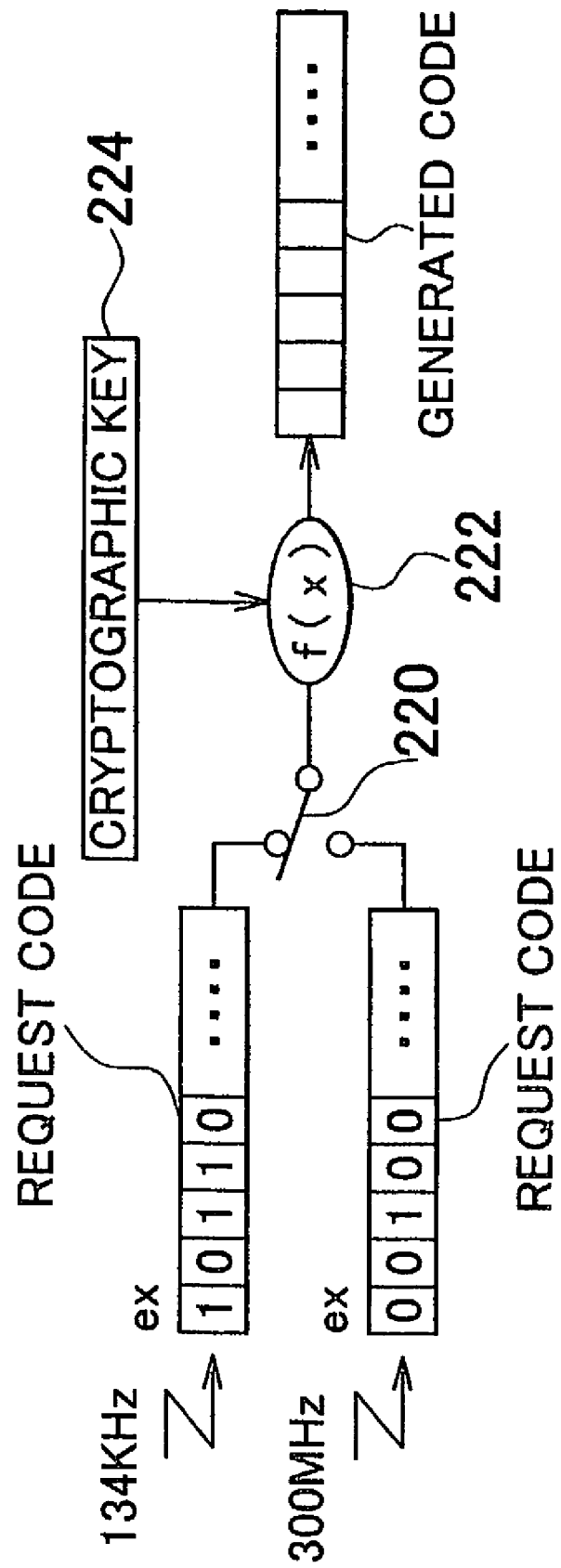
FIG. 10 is a view that shows a configuration of main parts of the portable unit provided in the system according to a modified example of the embodiment of the invention.

FIG. 10 shows a configuration of main parts of the portable unit 22 provided in the system according to a modified example of the invention. The portable ECU 76 of the portable unit 22 includes a register that connects to the first receiver portion 70 and a register that connects to the second receiver portion 72. The data of the request signals having mutually different code content, which are transmitted at the same time, are stored in the respective corresponding registers. A cryptographic computing portion 222 is connected to each register through a switch 220. A cryptographic key 224 is connected to the cryptographic computing portion 222. The switch 220 has a function that executes the appropriate switching of the registers connected to the cryptographic computing portion 222. The cryptographic computing portion 222 executes decryption and code generation for the data stored in the register connected through an operation of the switch 220, according to cryptographic key information of the cryptographic key 224. The generated code is transmitted from the transmission portion 74 to the on-vehicle unit 20 as the response signal.

In this configuration, the portable unit 22 can receive the request signals on each frequency at the same time. It can also, after this, process each request signal serially and return the response signals. Therefore, in this configuration, if the request signal on each frequency is transmitted at the same time and received at the same time, the communication between the on-vehicle unit 20 and the portable unit 22 is made more complicated than in a configuration where each request signal is transmitted and received one-by-one, and high security is ensured. Furthermore, in this configuration, because each request signal that the on-vehicle unit 20 transmits includes a mutually different code content, the difficulty of decryption increases, and security can be further improved.

Furthermore, according to embodiments 2 and 3 of the invention, on implementation of the engine start control, the downlink communication between the on-vehicle unit 20 and the portable unit 22 is carried out first utilizing the 134 kHz frequency radio wave and then, after the collation of that downlink communication is completed, utilizing the 300 MHz frequency radio wave. Further, the decryption and code generation for each of the request signals of both downlink communications is carried out utilizing the predetermined cryptographic keys that are stored in the portable ECU 76. However, a variable request code encrypted by a random number may be transmitted in one of the downlink communications, a cryptographic key code that corresponds to that random number may be transmitted in the other and the decryption and code generation for the variable request code may be carried out utilizing that cryptographic key.

FIG. 11 shows a configuration of main parts of the portable unit 22, provided in the system according to a modified example of the invention. The portable ECU 76 of the portable unit 22 includes a register that connects to the first receiver portion 70 and a register that connects to the second receiver portion 72. The data of the variable request codes and cryptographic key codes transmitted from the on-vehicle unit 20 are stored in the respective registers. A cryptographic computing portion 240 is connected to each register. The cryptographic computing portion 240 executes decryption and code generation for the supplied variable request code according to the supplied cryptographic key code. The generated code is transmitted from the transmission portion 74 to the on-vehicle unit 20 as the response signal.

In this configuration, the request signals, which can be encrypted by different methods according to the random numbers, are generated by the on-vehicle unit 20. Even if those request signals are transmitted to the portable unit 22, however, the cryptographic keys that correspond to the random number are also transmitted. Therefore, the portable unit 22 can decrypt that request signal accurately. Furthermore, the on-vehicle unit 20 encrypts the request code for each transmission with a different method according to the random numbers. If the on-vehicle unit 20 stores the random numbers, the collation of the response signal from the portable unit 22 is possible. Therefore, according to this configuration, the request signal is generated to be encrypted by a different method for each transmission. Therefore, extremely high security can be ensured in comparison to the configuration where the cryptographic key is stored inside the portable unit 22. Furthermore, according to this configuration, the response message is returned from the portable unit 22 to the on-vehicle unit 20 only once. Therefore, as in embodiments 2 and 3 of the invention, the signal process time in the portable unit 22 and the on-vehicle unit 20 is shortened, in comparison to the configuration where the response message is returned twice. Note that in this case, if the variable request code and the cryptographic key code are transmitted from the on-vehicle unit 20 at the same time, and received by the portable unit 22 at the same time, the communication between the on-vehicle unit 20 and the portable unit 22 becomes complicated, ensuring even higher security.

In embodiments 1 to 3 according to the invention, the transmission of the vehicle outside request signal for unlocking the vehicle door is carried out when the vehicle door outer handle is operated. This invention, however, is not limited to this. Transmission of this signal may occur, for example, when the prospective vehicle occupant is detected in the proximity of the vehicle or at regular time intervals etc.

In embodiments 1 to 3 according to the invention, although the vehicle outside transmission portion 34 and the first vehicle inside transmission portion 36 transmit the 134 kHz frequency request signal through the antennas 24 and 26 respectively, the invention, is not limited to this. The request signal may be transmitted utilizing another LF band frequency. Furthermore, although the second vehicle inside transmission portion 38 transmits the 300 MHz frequency request signal through the antenna 28, the invention is not limited to this. The request signal may be transmitted utilizing another UHF band frequency, such as 400 MHz, or a VHF band frequency such as 200 MHz.

Furthermore, in embodiments 1 to 3 according to the invention, although the engine is used as the vehicle power source, this invention is not limited to this. The invention can be applied to a vehicle that utilizes an electric motor as the power source, such as an electric vehicle, a hybrid vehicle and so on. In this type of vehicle, inverter noise is generated when the electric motor is operating. As in the vehicle that has the engine as the power source, if the comparatively low frequency radio wave is utilized for the downlink communication from the on-vehicle unit 20 to the portable unit 22, communication errors become easy to generate. In this configuration, however, if the frequency to be used for the downlink communication is different for when the electric motor is operating and for when the electric motor is not operating, that is, if the downlink communication is carried out utilizing the comparatively low frequency radio wave when the electric motor is not operating and utilizing the comparatively high frequency radio wave when the electric motor is operating, then, in an identical fashion to the embodiments of the invention, it is possible, regarding the communication between the on-vehicle unit 20 and the portable unit 22, to ensure the stable communication area prior to the start of the vehicle power source, and to suppress the generation of communication errors after the start of the power source.

As stated above, according to the invention, regarding the communication between an on-vehicle unit and a portable unit, a stable communication area can be ensured prior to the start of a vehicle power source, and generation of communication errors caused by the operation of that source after its start can be suppressed.

Furthermore, it is possible to suppress generation of communication errors caused by operation of a vehicle power source, when carrying out determination as to whether the portable unit is present inside the vehicle compartment using the communication between the on-vehicle unit and the portable unit after the start of the vehicle power source.

Furthermore, it is possible to ensure a stable communication area when carrying out permission for start of the vehicle power source using the communication between the on-vehicle unit and the portable unit.

Furthermore, it is possible to ensure high security regarding the communication between the on-vehicle unit and the portable unit.

Furthermore, it is possible to avoid delay in the execution start of a predetermined process by the on-vehicle unit while ensuring high security regarding the communication between an on-vehicle unit and the portable unit.

Furthermore, it is possible to avoid delay in the execution start of the predetermined process by the on-vehicle unit and suppress the generation of communication errors while ensuring high security regarding the communication between the on-vehicle unit and the portable unit.

Furthermore, it is possible to realize extremely high security communication between the on-vehicle unit and the portable unit.

Furthermore, it is possible to improve the security of the communication between the on-vehicle unit and the portable unit because the decryption of the request signal from the on-vehicle unit is made complicated.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An on-vehicle equipment remote control system, comprising:
   a portable unit that can be carried; and
   an on-vehicle unit that executes a predetermined process when a code content of a response signal issued by the portable unit in response to a transmitted request signal matches a required content, wherein
   the on-vehicle unit transmits a request signal at least on a first frequency and on a second frequency that is higher than the first frequency, and the on-vehicle unit transmits the request signal on the first frequency prior to a start of a vehicle power source, and transmits the request signal on the second frequency that is higher than the first frequency after the start of the vehicle power source.

2. The on-vehicle equipment remote control system according to claim 1, wherein
   the first frequency is an LF band frequency and the second frequency is one of a VHF band frequency and a UHF band frequency.

3. The on-vehicle equipment remote control system according to claim 1, wherein
   the on-vehicle unit, after start of the vehicle power source, collates the code content of the response signal transmitted by the portable unit to determine whether the portable unit is present inside the vehicle.

4. The on-vehicle equipment remote control system according to claim 1, wherein
   the on-vehicle unit, prior to the start of the vehicle power source, collates the code content of the response signal transmitted by the portable unit to permit the start of the vehicle power source.

5. The on-vehicle equipment remote control system according to claim 1, wherein
   the on-vehicle unit, prior to the start of the vehicle power source, transmits the request signal on the first frequency and transmits the request signal on the second frequency.

6. The on-vehicle equipment remote control system according to claim 5, wherein
   the on-vehicle unit, prior to the start of the vehicle power source, starts execution of the predetermined process if the code content of the response signal issued by the portable unit in response to the request signal transmitted on one of the first and second frequencies matches the required code content and, after that, stops or prohibits execution of the predetermined process if the code content of the response signal issued by the portable unit in response to the request signal transmitted on the other frequency does not match the required code content.

7. The on-vehicle equipment remote control system according to claim 6, wherein
   the on-vehicle unit, prior to the start of the vehicle power source, gives start permission of the vehicle power source if the code content of the response signal issued by the potable unit in response to the request signal transmitted on the first frequency matches the required code content and, after that, stops or prohibits the start permission of the vehicle power source if the code content of the response signal issued by the portable unit in response to the request signal transmitted on the second frequency does not match the required code content.

8. The on-vehicle equipment remote control system according to claim 5, wherein
   the on-vehicle unit, prior to the start of the vehicle power source, generates one of the request signal to be transmitted on the first frequency and the request signal to be transmitted on the second frequency as a random number code, and generates the other as a cryptographic code that corresponds to the random number code.

9. The on-vehicle equipment remote control system according to claim 1, wherein
   the on-vehicle unit generates the request signal to be transmitted on the first frequency and the request code to be transmitted on the second frequency using mutually different cryptographic codes.

10. The on-vehicle equipment remote control system according to claim 1, wherein
    the portable unit is able to receive the request signal on the first frequency and the request signal on the second frequency, respectively.

11. The on-vehicle equipment remote control system according to claim 1, wherein
    the portable unit transmits the response signal on one of a VHF band frequency and a UHF band frequency.

12. A remote control method of an on-vehicle equipment remote control system provided with a portable unit and an on-vehicle unit, comprising the steps of:
    transmitting a request signal using the on-vehicle unit;
    transmitting a response signal using the portable unit issued in response to the request signal; and
    executing a predetermined procedure using the on-vehicle unit if a code content of the response signal matches a required code content, wherein
    the on-vehicle unit transmits the request signal at least on a first frequency and on a second frequency that is higher than the first frequency, and the on-vehicle unit transmits the request signal on the first frequency prior to a start of a vehicle power source, and transmits the request signal on the second frequency that is higher than the first frequency after the start of the vehicle power source.

13. The remote control method according to claim 12, wherein
    the first frequency is an LF band frequency and the second frequency is one of a VHF band frequency and a UHF band frequency.

14. The remote control method according to claim 12, further comprising the step of:
    collating, using the on-vehicle unit, the code content of the response signal transmitted by the portable unit to determine whether the portable unit is present inside the vehicle, after start of the vehicle power source.

15. The remote control method according to claim 12, further comprising the step of:
    collating, using the on-vehicle unit, the code content of the response signal transmitted by the portable unit to permit the start of the vehicle power source, prior to the start of the vehicle power source.

16. The remote control method according to claim 12, further comprising the step of:
    transmitting the request signal on the first frequency and transmitting the request signal on the second frequency using the on-vehicle unit, prior to the start of the vehicle power source.

17. The remote control method according to claim 16, further comprising the steps of:

starting execution of the predetermined process using the on-vehicle unit if the code content of the response signal issued by the potable unit in response to the request signal transmitted on one of the first and second frequencies matches the required code content, prior to the start of the vehicle power source; and after that, stopping or prohibiting execution of the predetermined process using the on-vehicle unit if the code content of the response signal issued by the portable unit in response to the request signal transmitted on the other frequency does not match the required code content.

18. The remote control method according to claim 16, further comprising the step of:

generating one of the request signal to be transmitted on the first frequency and the request signal to be transmitted on the second frequency as a random number code, and generating the other as a cryptographic code that corresponds to the random number code using the on-vehicle unit, prior to the start of the vehicle power source.

19. The remote control method according to claim 12, further comprising the step of:

generating the request signal to be transmitted on the first frequency and the request signal to be transmitted on the second frequency with mutually different cryptographic codes using the on-vehicle unit.

20. The remote control method according to claim 12, wherein the portable unit transmits the response signal on one of a VHF band frequency and a UHF band frequency.

* * * * *